(12) United States Patent
Bodendorf et al.

(10) Patent No.: US 11,505,196 B2
(45) Date of Patent: Nov. 22, 2022

(54) START/STOP DEVICE FOR INITIATING AN AUTOMATIC ACTIVATION PROCESS OF AN AUTOMATICALLY DEACTIVATED DRIVE MACHINE

(71) Applicant: Bayerische Motoren Werke Aktiengesellschaft, Munich (DE)

(72) Inventors: Frank Bodendorf, Kaufering (DE); Johann Schweikl, Munich (DE); Steffen Mueller, Icking (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/172,203

(22) Filed: Oct. 26, 2018

(65) Prior Publication Data

US 2019/0061768 A1 Feb. 28, 2019

Related U.S. Application Data

(63) Continuation of application No. PCT/EP2017/059226, filed on Apr. 19, 2017.

(30) Foreign Application Priority Data

Apr. 28, 2016 (DE) ...................... 10 2016 207 280.3

(51) Int. Cl.
*B60W 30/192* (2012.01)
*B60W 30/18* (2012.01)
*F02N 11/08* (2006.01)

(52) U.S. Cl.
CPC .... *B60W 30/192* (2013.01); *B60W 30/18018* (2013.01); *B60W 30/18154* (2013.01);
(Continued)

(58) Field of Classification Search
CPC ......... B60W 30/192; B60W 30/18018; B60W 30/18154; B60W 30/18159;
(Continued)

(56) References Cited

U.S. PATENT DOCUMENTS 7,516,007 B2 * 4/2009 Tamai ...................... B60T 7/122
701/70
9,731,698 B1 * 8/2017 Khafagy ................ B60W 10/06
(Continued)

FOREIGN PATENT DOCUMENTS

| CN | 102405166 A | 4/2012 |
| DE | 100 23 331 A1 | 6/2001 |

(Continued)

OTHER PUBLICATIONS

International Search Report (PCT/ISA/210) issued in PCT Application No. PCT/EP2017/059226 dated Jul. 21, 2017 with English translation (five pages).
(Continued)

*Primary Examiner* — Robert A Werner
(74) *Attorney, Agent, or Firm* — Crowell & Moring LLP

(57) ABSTRACT

A start/stop device initiates an automatic activation process of an automatically deactivated drive machine of a motor vehicle, in particular of a motor vehicle with an automatic transmission. The drive machine can be automatically deactivated when the motor vehicle is traveling, and the automatically deactivated drive machine can be activated on the basis of driver actions. The start/stop device is configured to initiate an automatic activation of the drive machine which is automatically deactivated when the motor vehicle is traveling on the basis of a detected drive dynamic desired by the driver.

14 Claims, 1 Drawing Sheet

(52) U.S. Cl.
CPC ... *B60W 30/18163* (2013.01); *F02N 11/0822* (2013.01); *F02N 11/0837* (2013.01); *B60W 2540/10* (2013.01); *B60W 2540/12* (2013.01); *B60W 2554/804* (2020.02); *B60W 2555/60* (2020.02); *F02N 2200/101* (2013.01); *F02N 2200/102* (2013.01); *F02N 2200/104* (2013.01); *F02N 2200/123* (2013.01); *F02N 2200/125* (2013.01); *Y02T 10/40* (2013.01)

(58) Field of Classification Search
CPC .......... B60W 30/18163; F02N 11/0814–0822; F02N 11/0833–0837; F02N 11/0844; F02D 41/042; F02D 41/045; F02D 41/06–065
See application file for complete search history.

(56) References Cited

U.S. PATENT DOCUMENTS

| | | | |
|---|---|---|---|
| 2001/0025220 A1* | 9/2001 | Kaneko | B60K 6/485 701/112 |
| 2005/0131622 A1 | 6/2005 | Braun et al. | |
| 2005/0211479 A1* | 9/2005 | Tamor | B60K 6/48 180/65.25 |
| 2008/0029331 A1* | 2/2008 | Schiele | B60K 6/485 180/338 |
| 2011/0054765 A1 | 3/2011 | Lewis et al. | |
| 2011/0238284 A1 | 9/2011 | Bollig et al. | |
| 2012/0053808 A1 | 3/2012 | Arai et al. | |
| 2012/0191330 A1* | 7/2012 | Nitz | F02N 11/0822 701/113 |
| 2013/0191005 A1* | 7/2013 | Hrovat | F02N 11/0837 701/102 |
| 2014/0066255 A1* | 3/2014 | Yu | F02N 11/0822 477/203 |
| 2014/0257677 A1* | 9/2014 | Sangameswaran | F02D 45/00 701/112 |
| 2014/0297165 A1* | 10/2014 | Matsunaga | B60W 10/06 701/112 |
| 2016/0305388 A1* | 10/2016 | Miller | F02N 11/0818 |
| 2018/0118206 A1* | 5/2018 | Yamakado | B60W 30/143 |

FOREIGN PATENT DOCUMENTS

| | | |
|---|---|---|
| DE | 20 2004 003 215 U1 | 4/2004 |
| DE | 103 57 933 A1 | 7/2005 |
| DE | 10 2008 061 790 A1 | 7/2010 |
| DE | 10 2009 039 090 A1 | 3/2011 |
| DE | 10 2010 034 554 A1 | 3/2011 |
| DE | 10 2009 050 520 A1 | 4/2011 |
| DE | 10 2009 056 794 A1 | 6/2011 |
| DE | 10 2012 217 076 A1 | 4/2013 |
| DE | 10 2013 200 683 A1 | 7/2013 |
| DE | 10 2012 217 899 A1 | 6/2014 |
| DE | 10 2014 203 988 A1 | 9/2014 |
| DE | 10 2014 205 391 A1 | 9/2015 |
| DE | 10 2015 210 079 A1 | 12/2016 |
| JP | 2002-322924 A | 11/2002 |
| JP | 2012-172637 A | 9/2012 |

OTHER PUBLICATIONS

German-language Written Opinion (PCT/ISA/237) issued in PCT Application No. PCT/EP2017/059226 dated Jul. 21, 2017 (four pages).

German-language Search Report issued in counterpart German Application No. 10 2016 207 280.3 dated Dec. 19, 2016 with partial English translation (10 pages).

German-language Search Report issued in counterpart German Application No. 10 2016 207 278.1 dated Dec. 19, 2016 with partial English translation (10 pages).

Chinese-language Office Action issued in Chinese Application No. 201780024067.0 dated Apr. 3, 2020 with English translation (14 pages).

* cited by examiner

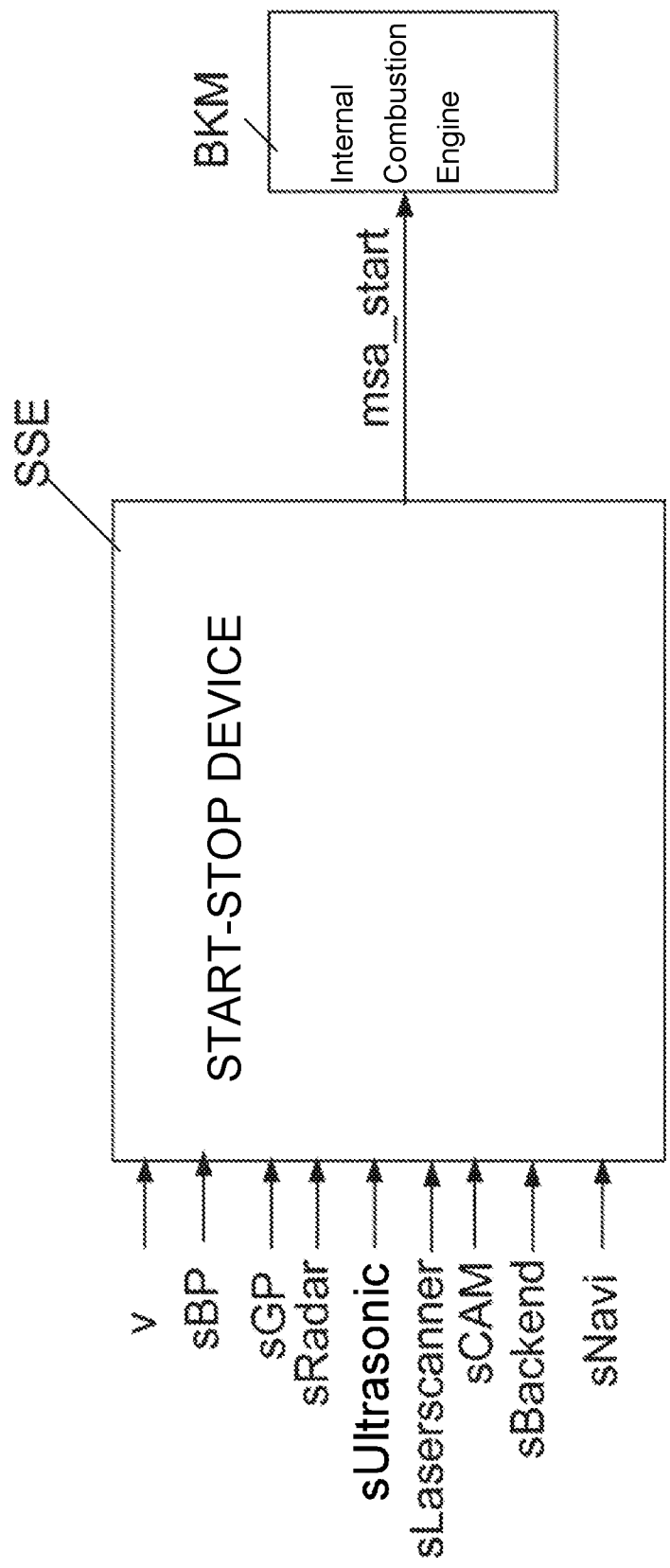

START/STOP DEVICE FOR INITIATING AN AUTOMATIC ACTIVATION PROCESS OF AN AUTOMATICALLY DEACTIVATED DRIVE MACHINE

CROSS REFERENCE TO RELATED APPLICATIONS

This application is a continuation of PCT International Application No. PCT/EP2017/059226, filed Apr. 19, 2017, which claims priority under 35 U.S.C. § 119 from German Patent Application No. 10 2016 207 280.3, filed Apr. 28, 2016, the entire disclosures of which are herein expressly incorporated by reference.

BACKGROUND AND SUMMARY OF THE INVENTION

The invention relates to a start-stop device for triggering an automatic switch-on procedure of a drive machine that has been automatically switched off in a motor vehicle.

Internal combustion engines are essentially usually switched off manually by the driver by use of an ignition key. One exception is a method that is disclosed in DE 100 23 331 A1. In this case, the brake pedal position or the brake pedal pressure is evaluated in lieu of the ignition key. The switch-off procedure of the internal combustion engine is initiated if the brake pedal is actuated more intensely in its already actuated position after the motor vehicle has come to a standstill. In order to travel further, the brake pedal is released and the gas pedal is pressed, as a result of which a procedure of starting the internal combustion engine is initiated. The disadvantage with this particular method is that the motor vehicle driver alone is responsible for switching off the internal combustion engine. Analysis of modern driving behavior indicates that despite an increased environmental awareness and increased fuel prices, the internal combustion engine is rarely switched off independently manually such as, for example, at traffic signals.

In order to reduce fuel consumption and pollutant emissions, methods and systems are already currently used in many vehicles to automatically switch off the internal combustion engine of a motor vehicle when the vehicle is at a standstill under specific conditions or if predetermined switch-off conditions are present. These systems automatically switch the internal combustion engine back on if predetermined switch-on conditions are present. Methods and systems of this type or start-stop devices are suitable above all for urban traffic for reducing the fuel consumption since in urban traffic the vehicle often comes to a standstill at traffic signals or on account of the traffic and the operation of the internal combustion engine is no longer required.

A method of this type is disclosed by way of example in DE 10 2008 061 790 A1. In this case, the internal combustion engine is automatically switched off if the vehicle is braked to a standstill and said vehicle is held at a standstill by means of actuating the brake pedal. Furthermore, an automatic procedure of starting the internal combustion engine may be prevented when the brake pedal is released if the brake pedal is pressed intensely when the internal combustion engine is switched off. A procedure of restarting is only then performed if the gas pedal is actuated or if an imminent actuation of the gas pedal is identified by means of a footwell monitoring unit.

DE 10 2012 217 899 A1 discloses a method for automatically switching off and starting a drive machine by use of a start-stop device that switches off the drive machine at speeds greater than zero if the gas pedal has been or is released and an (imminent) brake pedal actuation is not identified or assumed. The start-stop device then restarts the automatically switched-off drive machine if an imminent actuation of the gas pedal or brake pedal is identified or assumed by means of a footwell monitoring unit.

Furthermore, DE 10 2010 034 554 A1 discloses a system for switching off and starting an engine, wherein the engine is switched off while the vehicle is traveling if the speed is lower than a predetermined threshold speed and the brake pedal is actuated. The engine is then always restarted if the foot of the driver has released the brake and/or if the throttle position is greater than zero.

The object of the invention is to provide a system that in a simple and cost-effective manner starts an automatic switch-on procedure of a drive machine according to the requests of the driver, said drive machine having been previously automatically switched off while the vehicle was traveling.

This and other objects are achieved by a start-stop device in accordance with embodiments of the invention.

In the case of the start-stop device in accordance with the invention for triggering an automatic switch-on procedure of a drive machine that has been automatically switched off in a motor vehicle, in particular a motor vehicle having an automatic transmission, it is initially assumed that the start-stop device is embodied so as to trigger an automatic switch-off procedure of the drive machine when the motor vehicle is traveling if for example at least the brake pedal is actuated to a sufficient extent. In order to identify that the brake pedal has been sufficiently actuated, it is possible by way of example to evaluate the brake pedal position and/or the braking pressure that is applied and/or the braking torque that is triggered during the brake pedal actuation. As a further requirement for triggering an automatic switch-off procedure, it may be provided by way of example that the speed of the vehicle must be lower than a fixed or variable defined speed threshold (for example 15 km/h) prior to an automatic switch-off procedure being triggered. The term "drive machine" may be understood to be any drive machine that provides the force for driving the vehicle. In particular, in this case said drive machine may be an internal combustion engine.

The invention is furthermore based on the knowledge that when a drive machine is automatically switched off while the vehicle is traveling when the brake pedal is actuated, triggering a procedure of restarting the drive machine when the brake is released, does not always correspond with the request of the driver or is not expedient for energy efficiency reasons. An automatic switch-on procedure of the drive machine when the brake is released would thus conflict with the braking behavior of drivers who would like to roll to a stationary object or a red traffic signal using a switched-off drive machine and in this case would take his foot away from the brake entirely. A switch-on algorithm that only leads to an automatic switch-on procedure of the drive machine when the gas pedal is actuated (or when an actuation of the gas pedal is assumed) would likewise not always be expedient since this is too late in specific traffic situations or operating situations of the vehicle.

The fundamental idea of the invention is to provide a switch-on algorithm that is better coordinated with the requirements of the driver taking into account the aspect of energy consumption. In this case, it has proven to be advantageous depending upon the traffic situation and/or operating situation of the vehicle to also use different switch-on conditions or switch-on algorithms.

In order to be able to provide a system that follows the fundamental idea, in accordance with the invention it is provided that the above-explained start-stop device is further configured so as, depending upon an identified driving dynamic that is requested by the driver, to trigger an automatic switch-on procedure of the drive machine that has been automatically switched off while the vehicle was traveling (in other words at speeds greater than zero). The term "requested driving dynamic" may in particular also be understood as a requested negative driving dynamic, in other words a requested decelerating dynamic, and a decision regarding triggering an automatic switch-on procedure of the drive machine that has been automatically switched off is made depending upon said requested driving dynamic.

In order to be able to make a suitable decision, depending upon the identified (negative) driving dynamic that is requested by the driver, regarding triggering an automatic switch-on procedure of the drive machine that has been automatically switched off, the start-stop device is advantageously further configured so as to trigger an automatic switch-on procedure of the drive machine that has been automatically switched off while the motor vehicle was traveling in the case of an identified or assumed high driving dynamic that is requested by the driver and/or said start-stop device is configured so as, when a normal or low driving dynamic that is requested by the driver is identified or assumed not to trigger or to prevent an automatic switch-on procedure of the drive machine that has been automatically switched off while the motor vehicle was travelling, in other words the engine is not started, in the case of an identified or assumed lower normal driving dynamic that is requested by the driver (for example if the driver would only like to decelerate the vehicle less intensely by means of releasing the brake (in other words (negative) driving dynamic).

In order to identify a driving dynamic that is requested by the driver, it is possible, by way of example, to evaluate the pedal actuating dynamic that may be identified when the brake is released. For this purpose, the start-stop device may be configured, —in particular at speeds greater than zero— so as to trigger an automatic switch-on procedure of the drive machine depending upon the identified pedal actuating dynamic when the brake is released. For this purpose the start-stop device may be configured so as to then trigger an automatic switch-on procedure of the drive machine if (when the vehicle is moving) a high brake pedal release dynamic is identified, in particular then if the brake pedal is rapidly released, in other words at a speed that is greater than a predetermined threshold speed. In a similar manner to this, the start-stop device may also be configured (when the vehicle is moving) so as not to trigger an automatic switch-on procedure of the drive machine when the brake pedal is released if a normal or a low brake pedal release dynamic is identified, in other words in particular then if the brake pedal is released at a speed that is lower than a predetermined threshold speed.

If the switch-off algorithm is constructed in such a manner that at least one drive machine that has been automatically switched off when the motor vehicle was traveling may only be automatically switched on or may be automatically switched back on under specific conditions when the brake pedal is released, the switch-on algorithm must be expanded in such a manner that, if the drive machine is not switched on when the brake pedal is released (in particular whilst the vehicle is still in motion), the drive machine is automatically switched on at a later point in time or when specific operating conditions are present after releasing the brake pedal. It has been shown that the start-stop device may be advantageously configured, in the case of an—essentially possible but—not triggered automatic switch-on procedure of the drive machine when the brake pedal is released, so as to then trigger an automatic switch-on procedure of the drive machine depending upon the actuation of the gas pedal, wherein in particular then an automatic switch-on procedure of the drive machine is triggered if a predetermined gas pedal actuating threshold is exceeded when the gas pedal is actuated.

The start-stop device may likewise be advantageously embodied in the case of an—essentially possible but—not triggered automatic switch-on procedure of the drive machine when the brake pedal is released—in particular when the vehicle is moving—so as to trigger an automatic switch-on procedure of the drive machine depending upon an identified or assumed defined driving maneuver, wherein in particular then an automatic switch-on procedure of the drive machine is triggered if an overtaking request and/or lane changing request is identified or assumed. This functionality may be used in a similar manner so as to prevent an automatic switch-off procedure if the switch-off procedure and an expected start follow one another so closely with the result that an efficient engine stop duration is not achieved since the fuel savings for the engine off phase would not overcompensate for the consumption of energy for starting the engine. In this case, the procedure of switching off the engine may be delayed until the mentioned reasons are no longer an issue or a situation is identified that makes traveling further unlikely.

In order to identify the defined driving maneuver, different sensor signals may be evaluated, such as for example an indicator signal and/or a signal regarding the steering angle and/or signals identifying the surrounding area and/or information from a navigation device. In addition to the already mentioned defined driving maneuvers, the following driving maneuvers that are identified may trigger an automatic switch-on procedure of the drive machine when the brake pedal has already been released:

- if a relevant vehicle traveling ahead suddenly starts up or accelerates,
- if a traffic signal phase changes (identifiable for example via a camera or with reference to prevailing backend information,
- if the vehicle passes a traffic sign (for example respect right of way) or a stop line,
- if the vehicle switches into a new map segment having a higher dynamic than expected or lower probability of being at a standstill (for example entering a roundabout),
- if a turn in the road lies ahead in the route plan,
- if the end of a traffic jam is reached (that may be identified for example via so-called real time traffic information (abbreviated to RTTI) or
- if a combination of the mentioned driving maneuvers occurs.

This functionality may be used in a similar manner so as to already prevent an automatic switch-off procedure if the introduction of the switch-off procedure and the expected start would follow one another so closely with the result that an efficient engine stop duration is not achieved since the fuel savings for the engine off phase could not overcompensate for the consumption of energy for starting the engine. In this case, the procedure of switching off the engine may be delayed until the above-mentioned reasons are no longer an issue or a situation is identified that makes traveling further unlikely. For example, a switch-off automatic procedure of the drive machine when the vehicle is rolling can thus be prevented or not permitted if one of the above-defined driving situations is identified.

The start-stop device may likewise also be configured so as to not permit or to prevent an automatic switch-on procedure of the drive machine depending upon prevailing information regarding the surrounding area. By way of example, if it is possible to identify a request to drive further taking into account the prevailing information regarding the surrounding area this information may thus be used again in such a manner that the start-stop device does not permit or prevents an automatic switch-on procedure of the drive machine (when the vehicle is moving) if a request to drive further cannot be identified. In other words, if a request to drive further is not identified, a so-called switch-on preventer may be activated that prevents a switch-on procedure despite the presence of predetermined switch-on conditions. A request to not drive further may be identified in the following situations that are identified:

the vehicle traveling ahead is stationary or decelerating or the vehicle traveling ahead is traveling at the same speed, a red traffic signal may be identified for example by means of a camera and/or from prevailing backend data, a stop sign may be identified for example by means of a camera, a bottleneck and/or an oncoming vehicle in the driving range of the vehicle may be identified for example by means of PDC, radar, laser scanner and/or data from a navigation system (lane width), a turning maneuver and/or dead end lie ahead, the vehicle is driving into an entrance to a garage, an entrance to a courtyard, a parking lot of a ferry or a car transporter, a developing incline may be identified, for example by means of data of a navigation system, and/or a combination of any of these situations occurs.

The start-stop device may likewise be configured so as depending upon the requested driving dynamic that is identified or assumed, in particular depending upon the brake pedal release speed, to only then permit or to prevent an automatic startup procedure of the drive machine if with reference to the prevailing information regarding the surrounding area it is not possible to drive further or driving further is unlikely.

A request to not drive further in this case may also be identified for example by means of evaluating prevailing information regarding the surrounding area. The start-stop device may likewise be configured so as to suppress or not to trigger an automatic switch-on procedure of the drive machine if a situation is identified in which a request to drive further is not present and simultaneously only a driver switch-on reason having a normal dynamic is present in order to thus suppress a short-term, assumed undesirable switch-on procedure of the engine.

If the start-stop device is embodied so as to take into account information regarding the area surrounding the vehicle when making the decision regarding triggering an automatic switch-on procedure, the start-stop device may thus be configured in a particularly advantageous embodiment so as to permit or to prevent an automatic switch-on procedure of the drive machine depending upon prevailing information regarding the current prevailing state or the state that is to be imminently reached of a traffic signal that is relevant to the vehicle. In particular, the start-stop device may so as to then prevent or to limit an automatic starting procedure of the drive machine (despite the presence of a driver behavior that could lead at least in the case of specific conditions to an automatic switch-on procedure of the drive machine) if a traffic signal state that is relevant to the motor vehicle is identified that currently or imminently forbids traveling further. An automatic switch-on procedure of the drive machine may be limited in the case of corresponding prevailing information regarding the surrounding area in such a manner that, for example essentially in the case of a specific operational action, an automatic switch-on procedure of the drive machine is triggered but in the case of information regarding the surrounding area, which is identified and is limiting during the same operational action of the driver, an automatic switch-on procedure of the drive machine is only permitted when further switch-on requirements are present.

The start-stop device may likewise also be configured so as to permit, to limit or to prevent an automatic switch-on procedure of the drive machine depending upon prevailing information regarding a relevant vehicle traveling ahead (or that is stationary), in particular regarding prevailing information regarding the speed of the vehicle traveling ahead and where appropriate regarding the distance with respect to the vehicle traveling ahead or the position of said vehicle traveling ahead.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 illustrates in this case a construction of an exemplary start-stop device in accordance with the invention for triggering an automatic switch-on procedure of a drive machine that has been automatically switched off.

DETAILED DESCRIPTION OF THE DRAWING

In detail, the single FIG. 1 illustrates a start-stop device SSE that is configured so as to trigger a switch-on procedure of an internal combustion engine BKM of the motor vehicle by means of transmitting a signal msa_start, said internal combustion engine having been automatically switched off while the motor vehicle was traveling. The internal combustion engine of the motor vehicle (not further illustrated in this FIGURE) may either be the only drive machine of the motor vehicle or one of at least two drive machines such as is the case for example in the case of hybrid vehicles.

The start-stop device SSE obtains inter alia the following signals in order to be able to decide regarding the point in time of triggering the automatic switch-on procedure of the above-mentioned drive machine that has been automatically switched off: a speed signal v of the vehicle, a signal sBP that provides information regarding the actuation of the brake, a signal sGP that provides information regarding the actuation of the gas pedal, relevant signals sCAM of a camera of the motor vehicle, said camera being oriented forward, relevant information sUltrasonic from ultrasonic parking sensors in order to identify by way of example free spaces and distances from obstacles, relevant information sLaserscanner of an integrated laser scanner in order to identify by way of example free spaces and distances from obstacles, relevant signals sRadar of a radar system that is attached to the vehicle, relevant information sBackend of a vehicle external backend system and relevant signals sNavi of a navigation system including so-called real time traffic information. It is possible with reference to this data to identify the driving behavior, driver actions and for example above-defined driving situations and/or situations in which the vehicle does not travel further.

For the further explanation of the embodiment of the start-stop device SSE with regard to triggering an automatic switch-on procedure of the drive machine BKM, it is assumed that the internal combustion engine BKM has been switched off beforehand during the driving operation of the motor vehicle owing to a corresponding actuation of the brake pedal since there were no operating situations that prevent the switch-off procedure (for example a state of charge of a battery that is provided in the vehicle being too low and/or a speed being too high).

While the internal combustion engine BKM is in the automatically triggered OFF state, the start-stop device SSE initially continuously monitors the brake signal sBP for whether the brake is released. If with reference to the brake signal sBP it is identified that the brake is released, the release speed of the brake pedal is evaluated. For this purpose, either the chronological change in the position of the brake pedal and/or the brake pressure (or brake torque) that is applied by means of the actuation may be evaluated.

If—in particular in the case of a (still) rolling vehicle—it is identified that the brake pedal is released with a high dynamic, in other words the release speed is greater than a predetermined brake pedal release threshold speed, it is assumed that the driver at this point in time is requesting a high driving dynamic. Thereupon and by means of transmitting a start-signal msa_start, the start-stop device SSE triggers a procedure of starting the drive machine BKM.

However, if—in particular in the case of a (still) rolling vehicle—it is identified when releasing the brake pedal that the brake pedal is not released with a high dynamic (but rather with a normal or low dynamic), in other words the release speed is not greater than the predetermined brake pedal release threshold speed, it is assumed that the driver at this point in time is requesting a low dynamic. This could be for example the case if the vehicle moves into a traffic situation that currently prevents traveling further and the driver takes his foot away from the brake pedal in order to be able to slowly roll to the assumed position in which the vehicle comes to a standstill or to be able to slowly pass a bottleneck or a passage having pot holes or having a limited height or a water site etc. In the case of a normal or low dynamic that is requested by the driver and identified or assumed in this manner, the start-stop device SSE consequently initially does not trigger an automatic switch-on procedure of the drive machine BKM when the brake pedal is released.

Additional information regarding the area surrounding the traffic may be obtained with reference to the signals sCAM from a camera that is preferably oriented forward and said information could be relevant in the event that the vehicle is possibly traveling further, this information may be additionally prepared in order to be able to identify therefrom information regarding a possible request from the driver to travel further. This information may then be used so as to verify the assumption regarding the driving dynamic that is requested by the driver, said assumption being derived with reference to the actuation of the brake pedal. By way of example, in the case of an identified relevant traffic signal that is showing red, it is assumed that a request to travel further is not provided and it is assumed that the driver would like to allow the vehicle to roll into the position in which the vehicle comes to a standstill. With reference to the identified information regarding the surrounding area and the knowledge that is obtained from said information regarding the fact that it is not possible to travel further, this knowledge may likewise be used as a condition for decision algorithms in relation to triggering an automatic switch-on procedure depending upon brake pedal release speed when the brake pedal is released. Possible situations in which a request is made to not travel further in this case for example may be:

the vehicle traveling ahead is stationary or decelerating or the vehicle traveling ahead is traveling at the same speed, a red signal at a relevant traffic signal may be identified for example from the camera data sCAM and/or from prevailing backend data sBackend, a relevant stop sign that is to be reached imminently may be identified for example from the camera data sCAM, an end of a dead end that is to be reached imminently may be identified for example from the data sNavi of a navigation system, a bottleneck that lies ahead and/or an oncoming vehicle in the driving range of the vehicle may be identified for example by means of ultrasonic, radar (sRadar), laser scanner and/or data of a navigation system (sNavi), a turning maneuver lies ahead or is initiated, if it may be identified for example from the data sNavi of a navigation system that the vehicle is driving into an entrance to a garage, an entrance to a courtyard, a parking lot of a ferry or a car transporter (that lies ahead), a developing incline may be identified for example with reference to data sNavi of a navigation system by means of incline sensors.

By way of example, in the case of the drive machine BKM that has been automatically switched off, in particular in the case of a drive machine BKM that has been automatically switched off while the vehicle is traveling and when the vehicle is still rolling, with reference to the prevailing signals sRadar, sCAM, sBackend and sNavi that provide information regarding the area surrounding the vehicle the start-stop device SSE may still be configured so as to monitor for whether a defined driving situation has occurred by means of which an automatic procedure of starting the drive machine BKM is triggered independently of the driver action. For this purpose, the signals that are present sRadar, sCAM, sBackend and sNavi may be monitored to establish whether the following driving situations have occurred:

an overtaking maneuver lies ahead or is initiated, a change of lane lies ahead or is initiated a turning maneuver lies ahead or is initiated the vehicle traveling ahead suddenly starts up or accelerates, a relevant traffic signal phase changes, the vehicle passes a defined traffic sign, in particular a traffic sign that draws attention to the right of way of other vehicles, it is identified that the vehicle is passing a stop line, the motor vehicle switches onto a new road type, in particular if it is identified that the vehicle is switching onto a new road type having a higher than expected driving dynamic (in particular a defined driving situation of this type may be identified if the motor vehicle enters a roundabout), or the vehicle reaches the end of a traffic jam or if a traffic jam disperses.

If one of these driving situations is identified, the start-stop unit SSE triggers an automatic switch-on procedure of the drive machine BKM by means of transmitting a signal msa_start independently of a driver action that triggers a procedure of starting the drive machine BKM.

If an automatic switch-on procedure of the drive machine BKM is not triggered corresponding to the identified or assumed normal or low requested driving dynamic of the driver (low brake pedal release speed) and a defined driving situation has also not been identified on account of which the drive machine BKM has been started independently of a driver action that triggers the start, the start-stop device SSE monitors the gas pedal signal sGP in relation to an actuation of the gas pedal. If an actuation of the gas pedal by more than a predetermined gas pedal actuating threshold is identified, (where appropriate also independently of the prevailing information of the area surrounding the traffic) in any case an automatic procedure of starting the drive machine BKM is triggered, in order to be able to fulfill the request of the driver.

It is possible by means of the start-stop device that is proposed here and embodied in accordance with the invention to identify in a simple manner a situation in which a request for a high driving dynamic is not provided, and according to this knowledge a decision may be made as to whether an automatic switch-on procedure of the drive machine is to be triggered or not when the brake is released. By way of example, if a situation is identified in which a request to travel further is not provided and simultaneously only one driver switch-on reason having a normal dynamic is provided, said driver switch-on reason is suppressed in order to prevent a short-term undesired switch-on procedure of the engine.

The above-mentioned switch-on algorithm may also be used for example in plug-in hybrid vehicles in order to decide whether in the prevailing situation thrust recovery (for example so as to charge the battery) or a sailing procedure is to be used so as to increase the rolling range and rolling speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for triggering an automatic switch-on procedure of an automatically switched-off drive machine of a motor vehicle, comprising:
   a control unit programmed to execute a program stored in a memory, the program, when executed, causing the control unit to
   automatically switch off the drive machine while the motor vehicle is traveling;
   automatically switch on the drive machine based on driver actions; and
   trigger an automatic switch-on procedure of the drive machine which has been automatically switched-off when the motor vehicle is traveling based on a detected driving situation of the vehicle and independent of a driver action triggering starting of the drive machine, the detected driving situation being the motor vehicle switching into a new map segment having a lower probability of being at a standstill;
   wherein, when a request to travel further is not received by the control unit and simultaneously only one normal driving dynamic is requested by the driver, a switch-on procedure of the drive machine is prevented;
   wherein the control unit is programmed to not permit the automatic switch-on procedure of the drive machine depending upon prevailing information regarding a surrounding area obtained from a camera disposed on the motor vehicle; and
   wherein the control unit is programmed to verify the normal driving dynamic based on the prevailing information regarding the surrounding area obtained from the camera.

2. The apparatus as claimed in claim 1, wherein
the control unit is programmed to
trigger the automatic switch-on procedure of the drive machine that has been automatically switched off while the motor vehicle was traveling in the case of an identified high driving dynamic that is requested by the driver, and
trigger the automatic switch-on procedure of the drive machine that has been automatically switched off while the motor vehicle was traveling in the case of an identified normal or low driving dynamic that is requested by the driver.

3. The apparatus as claimed in claim 2, wherein
the control unit is programmed to trigger or to prevent the automatic switch-on procedure of the drive machine depending upon the pedal actuating dynamic when the brake pedal is released.

4. The apparatus as claimed in claim 1, wherein
the control unit is programmed to trigger the automatic switch-on procedure of the drive machine if a high brake pedal release dynamic is identified.

5. The apparatus as claimed in claim 4, wherein
the high brake pedal release dynamic is identified if the brake pedal is released at a speed that is greater than a predetermined threshold speed.

6. The apparatus as claimed in claim 1, wherein
the control unit is programmed to not trigger the automatic switch-on procedure of the drive machine if a normal or low brake pedal release dynamic is identified.

7. The apparatus as claimed in claim 6, wherein
the normal or low brake pedal release dynamic is identified if the brake pedal is released at a speed lower than a predetermined threshold speed.

8. The apparatus as claimed in claim 1, wherein
in the case of a possible but not triggered automatic switch-on procedure of the drive machine when a brake pedal is released, the control unit is programmed to trigger the automatic switch-on procedure depending upon actuation of a gas pedal.

9. The apparatus as claimed in claim 8, wherein
the actuation of the gas pedal is a type of actuation of the gas pedal wherein the automatic switch-on procedure of the drive machine is triggered if a predetermined gas pedal actuating threshold is exceeded when the gas pedal is actuated.

10. The apparatus as claimed in claim 1, wherein
the control unit is programmed to permit or prevent the automatic switch-on procedure of the drive machine depending upon prevailing information regarding a current state or a state that is to be imminently reached of a traffic signal that is relevant to the motor vehicle.

11. The apparatus as claimed in claim 10, wherein
the automatic switch-on procedure of the drive machine is prevented or limited if a traffic signal state relevant to the motor vehicle is identified that currently or imminently prohibits traveling further.

12. The apparatus as claimed in claim 1, wherein
the control unit is programmed to permit, to limit, or to prevent the automatic switch-on procedure of the drive machine depending upon prevailing information regarding the vehicle ahead.

13. The apparatus as claimed in claim 12, wherein
the prevailing information regarding the vehicle ahead is a speed of said vehicle ahead.

14. The apparatus as claimed in claim 1, wherein
the motor vehicle is a motor vehicle having an automatic transmission.

\* \* \* \* \*